(12) United States Patent
Mo et al.

(10) Patent No.: US 11,775,108 B2
(45) Date of Patent: Oct. 3, 2023

(54) TOUCH DISPLAY APPARATUS, DRIVING CIRCUIT, AND DRIVING METHOD

(71) Applicant: FOCALTECH ELECTRONICS, LTD., Grand Cayman (KY)

(72) Inventors: Lianghua Mo, Guangdong (CN); Xinxi Jiang, Guangdong (CN); Junqiao Liu, Guangdong (CN)

(73) Assignee: FOCALTECH ELECTRONICS, LTD., Grand Cayman (KY)

( * ) Notice: Subject to any disclaimer, the term of this patent is extended or adjusted under 35 U.S.C. 154(b) by 296 days.

(21) Appl. No.: 17/246,644

(22) Filed: May 2, 2021

(65) Prior Publication Data
US 2021/0271368 A1 Sep. 2, 2021

Related U.S. Application Data

(63) Continuation of application No. 16/056,486, filed on Aug. 6, 2018, now abandoned, which is a (Continued)

(30) Foreign Application Priority Data

Dec. 31, 2013 (CN) .......................... 201310753359.1

(51) Int. Cl.
*G06F 3/041* (2006.01)
*G02F 1/1333* (2006.01)
(Continued)

(52) U.S. Cl.
CPC ...... *G06F 3/04166* (2019.05); *G02F 1/13338* (2013.01); *G02F 1/13439* (2013.01); *G06F 3/0412* (2013.01); *G09G 3/3655* (2013.01); *G09G 3/3677* (2013.01); *G09G 3/3688* (2013.01); *G06F 3/0443* (2019.05); *G09G 2310/0248* (2013.01); *G09G 2310/0281* (2013.01); *G09G 2310/08* (2013.01)

(58) Field of Classification Search
CPC ................... G06F 3/041; G06F 3/0412; G06F 3/044–0448; G06F 3/0416–04186
See application file for complete search history.

(56) References Cited

U.S. PATENT DOCUMENTS 8,866,751 B2 * 10/2014 Park ..................... G06F 3/04184
345/173
9,098,161 B2 * 8/2015 Shin ........................ G06F 3/044
(Continued)

*Primary Examiner* — Patrick F Marinelli
(74) *Attorney, Agent, or Firm* — Yue (Robert) Xu; Apex Attorneys at Law, LLP

(57) ABSTRACT

A touch display apparatus, a corresponding driving circuit, and a driving method are provided. The touch display apparatus includes a driving circuit configured to, during the touch sensing stage, provide a first signal to a common electrode for realizing touch detection during the touch sensing stage, a second signal used to control a thin film transistor of the touch display apparatus to be switched off and is used to decrease charge and discharge capacity of a capacitor formed by the common electrode and the gate line, and a third signal used to decrease charge and discharge capacity of a capacitor formed by the common electrode and a data line. The third signal is used to control the data line to enter a floating state during the touch sensing stage.

16 Claims, 9 Drawing Sheets

Related U.S. Application Data continuation of application No. 15/108,213, filed as application No. PCT/CN2014/072080 on Feb. 14, 2014, now Pat. No. 10,073,562.

(51) Int. Cl.
*G02F 1/1343* (2006.01)
*G09G 3/36* (2006.01)
*G06F 3/044* (2006.01)

(56) References Cited

U.S. PATENT DOCUMENTS

| | | | | |
|---|---|---|---|---|
| 9,223,425 | B1* | 12/2015 | Kim | G06F 3/04166 |
| 9,285,913 | B1* | 3/2016 | Kang | G06F 3/04184 |
| 9,293,078 | B2* | 3/2016 | Shin | G06F 3/0446 |
| 9,377,913 | B2* | 6/2016 | Kim | G06F 3/0443 |
| 9,430,963 | B2* | 8/2016 | Shin | G06F 3/0418 |
| 9,507,452 | B2* | 11/2016 | Pak | G09G 3/3648 |
| 9,690,437 | B2* | 6/2017 | Shin | G09G 5/003 |
| 9,778,773 | B2* | 10/2017 | Lin | G02F 1/136286 |
| 9,927,930 | B2* | 3/2018 | Lee | G02F 1/13338 |
| 10,372,256 | B2* | 8/2019 | Xie | G06F 3/044 |
| 2008/0018581 | A1* | 1/2008 | Park | G06F 3/04184 345/98 |
| 2011/0050585 | A1* | 3/2011 | Hotelling | G06F 3/0446 345/173 |
| 2012/0218482 | A1* | 8/2012 | Hwang | G06F 3/0445 349/12 |
| 2012/0242597 | A1* | 9/2012 | Hwang | G06F 3/0418 345/173 |
| 2014/0152617 | A1* | 6/2014 | Kida | G06F 3/04166 345/174 |
| 2014/0210774 | A1* | 7/2014 | Kim | G06F 3/0443 345/174 |
| 2015/0022477 | A1* | 1/2015 | Park | G09G 3/3648 345/173 |
| 2015/0091849 | A1* | 4/2015 | Ludden | G06F 3/0412 345/174 |
| 2015/0177880 | A1* | 6/2015 | Shin | G06F 3/0418 345/174 |
| 2015/0185937 | A1* | 7/2015 | Lee | G06F 3/04184 345/173 |
| 2016/0012766 | A1* | 1/2016 | Shin | G06F 3/0446 345/55 |
| 2016/0188065 | A1* | 6/2016 | Kang | G06F 3/0412 345/173 |
| 2016/0274704 | A1* | 9/2016 | Kim | G06F 3/0443 |
| 2016/0334934 | A1* | 11/2016 | Mo | G06F 3/04166 |
| 2017/0045975 | A1* | 2/2017 | Pak | G02F 1/13338 |
| 2017/0060289 | A1* | 3/2017 | Shin | G09G 3/20 |
| 2017/0269739 | A1* | 9/2017 | Shin | G06F 3/0412 |
| 2018/0024678 | A1* | 1/2018 | Nitobe | G06F 3/0445 345/174 |
| 2018/0095583 | A1* | 4/2018 | Kim | G06F 3/0412 |
| 2021/0271368 | A1* | 9/2021 | Mo | G02F 1/13439 |
| 2022/0147220 | A1* | 5/2022 | Chun | G06F 3/04166 |

* cited by examiner

TOUCH DISPLAY APPARATUS, DRIVING CIRCUIT, AND DRIVING METHOD

The present application is a continuation application of U.S. Ser. No. 16/056,486, which is a continuation application of U.S. Ser. No. 15/108,213, which is the national phase of International Application No. PCT/CN2014/072080, titled "TOUCH DISPLAY APPARATUS, DRIVING CIRCUIT, AND DRIVING METHOD", filed on Feb. 14, 2014, which claims the priority to Chinese Patent Application No. 201310753359.1, titled "TOUCH DISPLAY APPARATUS, DRIVING CIRCUIT, AND DRIVING METHOD", filed with the Chinese State Intellectual Property Office on Dec. 31, 2013, all of which are incorporated herein by reference in entirety.

FIELD

The disclosure relates to the field of touch technology, and in particular to a touch display apparatus, a driving circuit and a driving method.

BACKGROUND

Currently, a touch panel, as input medium, is a most simple, convenient and natural means for human-computer interaction.

Reference is made to FIG. 1, a liquid crystal display apparatus with an in-cell touch panel (In-cell touch panel) according to the conventional technology is shown. The liquid crystal display apparatus includes, from bottom to top, a thin film transistor (TFT, Thin Film Transistor) substrate 1, a liquid crystal layer (Liquid Crystal) 2 and a color filter (CF, Color Filter) substrate 3. The TFT substrate includes a first glass substrate 11, and thin film transistors 12 arranged on the first glass substrate 11. The CF substrate includes, from bottom to top, a common electrode 31, a color filter 32, a touch screen 33 and a second glass substrate 34. The touch screen 33 in FIG. 1 may be a self-capacitive touch screen. The self-capacitive touch screen detects capacitance formed by a driving electrode or a sensing electrode and the ground, and position detection is performed based on change in the capacitance caused by a finger touching the touch panel.

During the display of the liquid crystal display apparatus, a liquid crystal display driving circuit switches on the thin film transistors 12 row by row via a gate line, a data line provides a pixel voltage to a pixel electrode 35 of each sub-pixel, and the pixel voltage is provided to the common electrode 31. Reference is made to FIG. 2, an equivalent circuit diagram of a sub-pixel unit in the liquid crystal display apparatus shown in FIG. 1 is shown. An equivalent capacitor Clc is formed by the pixel electrode 35 and the common electrode 31. An electric field in the equivalent capacitor Clc may pass through liquid crystal molecules in the liquid crystal layer 2. The magnitude of the electric field determines an angle of rotation of the liquid crystal molecule, which in turn determines the strength of the light passing through this sub-pixel in a specific direction.

With increased requirement on lightness and thinness for the touch panel, the common electrode is reused as a detection electrode for self-capacitance touch detection. As shown in FIG. 3, a schematic diagram of a common electrode is shown. The common electrode includes multiple block electrodes 36 in four rows and four columns. Each of the block electrodes 36 is connected to a driving chip 37 via a connecting line. The driving chip 37 drives the multiple block electrodes 36 in a time-sharing manner. That is, the driving chip 37 drives the common electrode to a potential required for display during a display stage, and provides a touch detection signal to the common electrode during a touch detecting stage.

However, the common electrode forms multiple parasitic capacitors during the touch detecting stage, which affects the accuracy of the touch detection. Reference is made to FIG. 4, an equivalent circuit diagram of the sub-pixel unit of the touch display apparatus of the common electrode as shown in FIG. 3 is shown. The common electrode is used as a touch detection electrode. Thus, a parasitic capacitor Cmg is formed between the common electrode and a gate line, a parasitic capacitor Cms is formed between the common electrode and a data line, and a parasitic capacitor Cs is formed between the common electrode and an outline of a screen body. The parasitic capacitors would interfere with the touch detection.

SUMMARY

The problem to be solved by the present disclosure is to provide a touch display apparatus, a driving circuit and a driving method for reducing the interference to the touch detection from a parasitic capacitor and improve the accuracy of the touch detection.

To solve the above problem, it is provided a touch display apparatus for realizing touch sensing and displaying according to the present disclosure. The touch display apparatus includes: a first substrate; a second substrate arranged opposite to the first substrate, where gate lines, data lines and thin film transistors are arranged on a surface of the second substrate facing towards the first substrate; a liquid crystal layer arranged between the first substrate and the second substrate; a common electrode arranged between the first substrate and the second substrate and used as a touch sensing electrode during a touch sensing stage; and a driving circuit configured to provide a first signal to the common electrode for realizing touch detection during the touch sensing stage, where the driving circuit is further configured to provide a second signal to the gate line during the touch sensing stage, where the second signal is used to control the thin film transistor to be switched off and is used to decrease charge and discharge capacity of a capacitor formed by the common electrode and the gate line; and/or the driving circuit is further configured to provide a third signal to the data line during the touch sensing stage, where the third signal is used to decrease charge and discharge capacity of a capacitor formed by the common electrode and the data line.

Optionally, the second signal may be a pulse signal with a same frequency and a same phase as the first signal.

Optionally, the second signal may be a pulse signal with a same frequency, a same phase and a same amplitude as the first signal.

Optionally, the third signal may be a pulse signal with a same frequency and a same phase as the first signal.

Optionally, the third signal may be a pulse signal with a same frequency, a same phase and a same amplitude as the first signal. Optionally, the third signal may be a signal used to control the data line to enter a floating state.

Optionally, the first signal, the second signal or the third signal may be a square signal, a sine wave signal or a stair-step signal.

Optionally, the driving circuit may be further configured to: provide a driving signal to the gate line, provide a display signal to the data line, and provide a common voltage signal to the common electrode, during a display stage.

Optionally, the driving circuit may include: a common electrode driving unit configured to generate the common voltage signal and a first pulse signal; a gate driving unit connected to multiple gate lines, where the gate driving unit may be configured to generate the driving signal, and is further configured to generate a second pulse signal with a same frequency as the first pulse signal; a data line driving unit connected to multiple data lines, and configured to generate the display signal; and a timing control unit connected to the common electrode driving unit, the gate driving unit and the data line driving unit, where the timing control unit may be configured to, during the display stage, control the gate driving unit to provide the driving signal to the multiple gate lines sequentially, control the data line driving unit to provide the display signal to the data line, and control the common electrode driving unit to provide the common voltage signal to the common electrode; and the timing control unit may be further configured to, during the touch sensing stage, control the common electrode driving unit to provide the first pulse signal to the common electrode for realizing touch detection, and control the gate driving unit to provide the second pulse signal with the same phase as the first pulse signal to the multiple gate lines.

Optionally, the data line driving unit may be further configured to generate a third pulse signal with a same frequency as the first pulse signal; and the timing control unit may be further configured to control the data line driving unit to provide the third pulse signal with the same phase as the first pulse signal to the multiple data lines during the touch sensing stage.

Optionally, the driving circuit may further include switches arranged between the data line driving unit and the multiple data lines, and the data line driving unit may be configured to provide a pixel voltage to the data line as a display signal in a case that the switch is on; and the timing control unit may be connected to the switch, the timing control unit may be configured to control the switch to be switched on during the display stage to control the data line driving unit to provide the pixel voltage to the data line, and the timing control unit may be further configured to control the switch to be switched off during the touch sensing stage to control the data line to enter a floating state.

Optionally, the driving circuit may include: a common electrode driving unit configured to generate the common voltage signal and the first pulse signal; a gate driving unit connected to multiple gate lines, and configured to generate the driving signal; a data line driving unit connected to multiple data lines, where the data line driving unit may be configured to generate a display signal, and may be further configured to generate a third pulse signal with a same frequency as the first pulse signal; or a data line driving unit being coupled to the multiple data lines via a switch; and a timing control unit connected to the common electrode driving unit, the gate driving unit and the data line driving unit, where the timing control unit may be configured to, during the display stage, control the gate driving unit to provide the driving signal to the multiple gate lines sequentially, control the data line driving unit to provide the display signal to the data line, and control the common electrode driving unit to provide the common voltage signal to the common electrode; and the timing control unit may be further configured to, during the touch sensing stage, control the common electrode driving unit to provide the first pulse signal to the common electrode for realizing touch detection, and control the data line driving unit to provide the third pulse signal with the same phase as the first pulse signal to the multiple data lines or control the switch to be switched off to control the data line to enter a floating state.

Optionally, the driving circuit may be directly connected to the gate line.

Optionally, the driving circuit may be connected to the gate line in a capacitive coupling manner.

Accordingly, it is further provided a driving circuit for driving a touch display apparatus according to the present disclosure. The touch display apparatus includes: a first substrate; a second substrate arranged opposite to the first substrate, where gate lines, data lines and thin film transistors are arranged on a surface of the second substrate facing towards the first substrate; a liquid crystal layer arranged between the first substrate and the second substrate; and a common electrode arranged between the first substrate and the second substrate and used as a touch sensing electrode during a touch sensing stage. The driving circuit includes: a first driving module configured to provide a first signal to the common electrode for realizing touch detection during the touch sensing stage; a second driving module configured to provide a second signal to the gate line during the touch sensing stage, where the second signal is used to control the thin film transistor to be switched off and is used to decrease charge and discharge capacity of a capacitor formed by the common electrode and the gate line; and/or a third driving module configured to provide a third signal to the data line during the touch sensing stage, where the third signal is used to decrease charge and discharge capacity of a capacitor formed by the common electrode and the data line.

Optionally, the second signal may be a pulse signal with a same frequency and a same phase as the first signal.

Optionally, the second signal may be a pulse signal with a same frequency, a same phase and a same amplitude as the first signal.

Optionally, the third signal may be a pulse signal with a same frequency and a same phase as the first signal.

Optionally, the third signal may be a pulse signal with a same frequency, a same phase and a same amplitude as the first signal.

Optionally, the third signal may be a signal used to control the data line to enter a floating state.

Optionally, the first signal, the second signal or the third signal may be a square signal, a sine wave signal or a stair-step signal.

Optionally, the first driving module may be further configured to provide a common voltage signal to the common electrode during a display stage, the second driving module may be further configured to provide a driving signal to the gate line during the display stage, and the third driving module may be further configured to provide a display signal to the data line during the display stage.

Optionally, the driving circuit may include: a common electrode driving unit configured to generate the common voltage signal and a first pulse signal; a gate driving unit connected to multiple gate lines, where the gate driving unit may be configured to generate the driving signal, and may be further configured to generate a second pulse signal with a same frequency as the first pulse signal; a data line driving unit connected to multiple data lines, and configured to generate the display signal; a timing control unit connected to the common electrode driving unit, the gate driving unit and the data line driving unit, where the timing control unit may be configured to, during the display stage, control the gate driving unit to provide the driving signal to the multiple gate lines sequentially, control the data line driving unit to provide the display signal to the data line, control the common electrode driving unit to provide the common voltage signal to the common electrode, and the timing control unit may be further configured to, during the touch sensing stage, control the common electrode driving unit to provide the first pulse signal to the common electrode for realizing touch detection, and control the gate driving unit to provide the second pulse signal with the same phase as the first pulse signal to the multiple gate lines.

Optionally, the data line driving unit may be further configured to generate a third pulse signal with a same frequency as the first pulse signal; and the timing control unit may be further configured to control the data line driving unit to provide the third pulse signal with the same phase as the first pulse signal to the multiple data lines during the touch sensing stage.

Optionally, the driving circuit may further include switches arranged between the data line driving unit and the multiple data lines, and the data line driving unit may be configured to provide a pixel voltage to the data line as a display signal in a case that the switch is on; and the timing control unit may be connected to the switch, the timing control unit may be configured to control the switch to be switched on during the display stage to control the data line driving unit to provide the pixel voltage to the data line; and the timing control unit may be further configured to control the switch to be switched off during the touch sensing stage to control the data line to enter a floating state.

Optionally, the driving circuit may include: a common electrode driving unit configured to generate the common voltage signal and the first pulse signal; a gate driving unit connected to multiple gate lines, and configured to generate the driving signal; a data line driving unit connected to multiple data lines, where the data line driving unit may be configured to generate a display signal, and may be further configured to generate a third pulse signal with a same frequency as the first pulse signal; or a data line driving unit connected to the multiple data lines via a switch; and a timing control unit connected to the common electrode driving unit, the gate driving unit and the data line driving unit, where the timing control unit may be configured to, during the display stage, control the gate driving unit to provide the driving signal to the multiple gate lines sequentially, control the data line driving unit to provide the display signal to the data line, and control the common electrode driving unit to provide the common voltage signal to the common electrode, and the timing control unit may be further configured to, during the touch sensing stage, control the common electrode driving unit to provide the first pulse signal to the common electrode for realizing touch detection, and control the data line driving unit to provide the third pulse signal with the same phase as the first pulse signal to the multiple data lines or control the switch to be switched off to control the data line to enter a floating state.

Optionally, the first driving module may be directly connected to the gate line.

Optionally, the first driving module may be connected to the gate line in a capacitive coupling manner.

Accordingly, it is provided a driving method for driving a touch display apparatus according to the present disclosure. The touch display apparatus includes: a first substrate; a second substrate arranged opposite to the first substrate, where gate lines, data lines and thin film transistors are arranged on a surface of the second substrate facing towards the first substrate; a liquid crystal layer arranged between the first substrate and the second substrate; and a common electrode arranged between the first substrate and the second substrate and used as a touch sensing electrode during a touch sensing stage. The driving method includes: providing a driving signal to the multiple gate lines sequentially, providing a display signal to the data line, and providing a common voltage signal to multiple electrode units of the common electrode, during a display stage; and providing a first signal to the common electrode for realizing touch detection during the touch sensing stage; providing a second signal to the gate line in the process of providing the first signal to the common electrode, where the second signal is used to control the thin film transistor to be switched off and is used to decrease charge and discharge capacity of a capacitor formed by the common electrode and the gate line; and/or providing a third signal in the process of providing the first signal to the common electrode, where the third signal is used to decrease charge and discharge capacity of a capacitor formed by the common electrode and the data line. The second signal may be a pulse signal with a same frequency and a same phase as the first signal.

Optionally, the second signal is a pulse signal with a same frequency, a same phase and a same amplitude as the first signal.

Optionally, the third signal may be a pulse signal with a same frequency and a same phase as the first signal.

Optionally, the third signal may be a pulse signal with a same frequency, a same phase and a same amplitude as the first signal.

Optionally, the third signal may be a signal used to control the data line to enter a floating state.

Optionally, the first signal, the second signal or the third signal may be a square signal, a sine wave signal or a stair-step signal.

Compared with the conventional technology, the technical solution according to the present disclosure has the following advantages:

with the driving circuit of the touch display apparatus according to the present disclosure, during the touch sensing stage, the first signal is provided to the common electrode, the second signal is provided to the gate line and/or the third signal is provided, thus charge and discharge capacity of a parasitic capacitor formed by the common electrode and/or the gate line is decreased. Interference of the parasitic capacitor to the touch detection is reduced by decreasing the charge and discharge capacity of the parasitic capacitor, thus the accuracy of touch detection is improved.

DETAILED DESCRIPTION OF EMBODIMENTS

To make the above features and advantages of the disclosure more apparent and easier to be understood, specific embodiments of the disclosure are illustrated in detail hereinafter in conjunction with the drawings.

Figure 5:
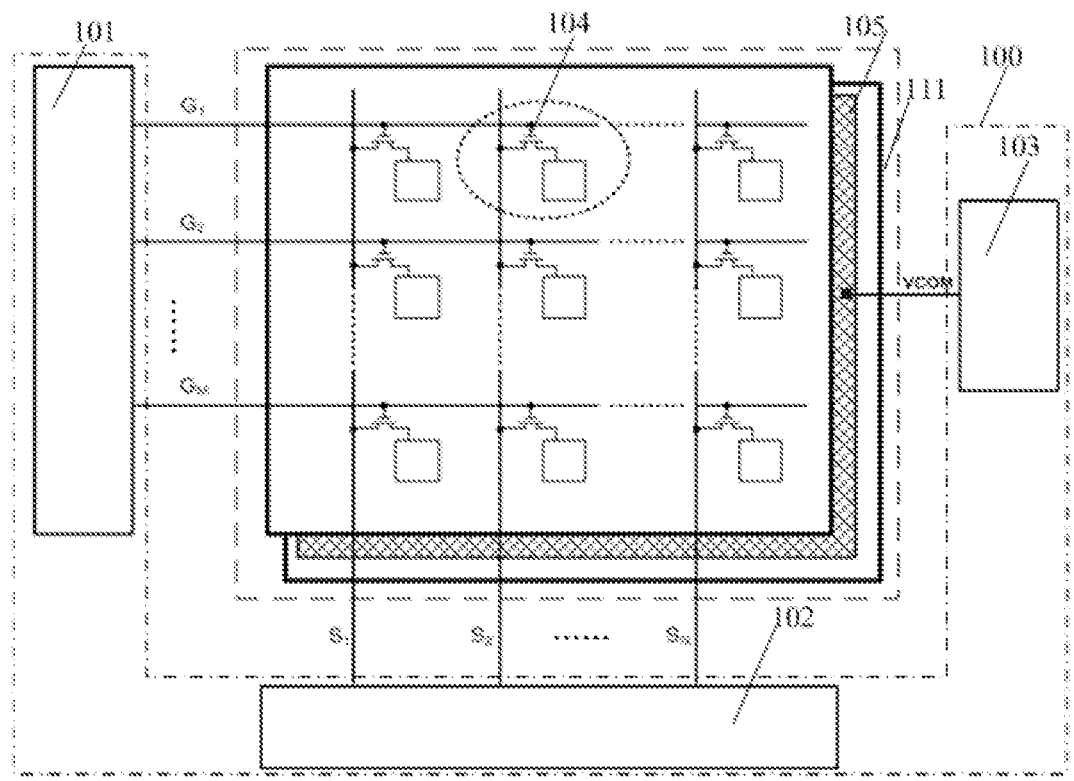
FIG. 5 is a schematic diagram of a touch display apparatus according to an embodiment of the present disclosure.

To solve the problem mentioned in the background, it is provided a touch display apparatus according to the present disclosure. Reference is made to FIG. 5, a schematic diagram of a touch display apparatus according to an embodiment of the present disclosure is shown. The touch display apparatus includes a first substrate (not shown), a second substrate 111, a liquid crystal layer, a common electrode 105 and a driving circuit 100.

The first substrate is used as a glass substrate at a side of a color filter (Color Filter, CF).

The second substrate 111 is used as a glass substrate at a side of a thin film transistor (Thin Film Transistor, TFT). The second substrate 111 is arranged opposite to the first substrate.

Multiple gate lines $G_1, G_2 \ldots G_M$, multiple data lines $S_1, S_2 \ldots S_N$ and thin film transistors 104 are arranged on a surface of the second substrate 111 facing towards the first substrate. A drain of the thin film transistor 106 is connected to a pixel electrode (not shown). The multiple gate lines $G_1, G_2 \ldots G_M$ are electrically connected to gates of the thin film transistors 104, and configured to provide driving signals to the gates of the thin film transistors 104. The multiple data lines $S_1, S_2 \ldots S_N$ are connected to sources of the thin film transistors 104, and are configured to provide pixel voltages to the sources of the thin film transistors 106.

The liquid crystal layer (not shown) is arranged between the first substrate and the second substrate 111.

The common electrode 105 is arranged between the first substrate and the second substrate 111. The common electrode 105 is used as a touch sensing electrode during a touch sensing stage, and is provided with a common voltage (VCOM) during a display stage. Specifically, the common electrode 105 may include multiple electrode units arranged in a matrix, and the multiple electrode units are detection electrodes for realizing self-capacitive detection in the touch sensing.

The driving circuit 100 is configured to provide a first signal to the common electrode 105 for realizing touch detection during the touch sensing stage. The driving circuit 100 is further configured to provide a second signal to the gate lines $G_1, G_2 \ldots G_M$ during the touch sensing stage. The second signal is used to control the thin film transistor to be switched off and is used to decrease charge and discharge capacity of a capacitor formed by the common electrode and the gate line. And/or, the driving circuit 100 is further configured to provide a third signal during the touch sensing stage. The third signal is used to decrease charge and discharge capacity of a capacitor formed by the common electrode and the data line.

It should be noted that, to decrease the charge and discharge capacity of the capacitor formed by the common electrode 105 and the gate line (the data line) herein refers to: to decrease the charge and discharge capacity as compared with that of a capacitor in a case that no second signal (no third signal).

With the touch display apparatus according to the embodiment, the first signal provided to the common electrode and the second signal (the third signal) by the driving circuit can decrease the charge and discharge capacity of the parasitic capacitor formed by the common electrode and the gate line (the data line), thus interference of the parasitic capacitor to the touch detection is reduced, and accuracy of the touch detection is improved.

Figure 6:
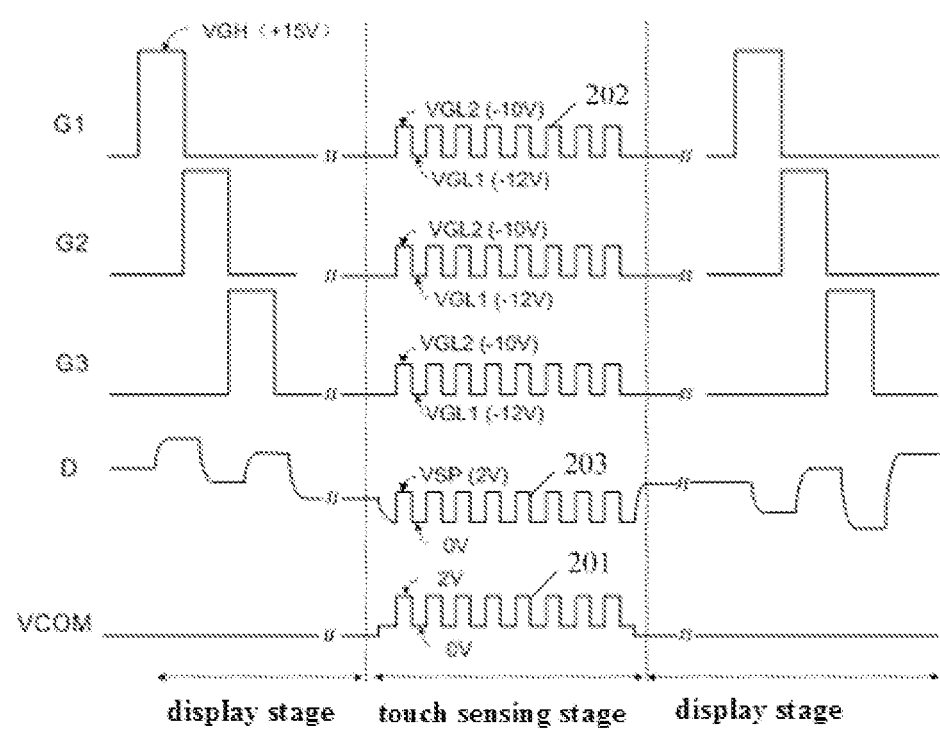
FIG. 6 is a schematic diagram of a driving signal of the touch display apparatus shown in FIG. 5.

Next, a principle of improving the accuracy of the touch detection by the touch display apparatus according to the embodiment shown in FIG. 5 is explained in conjunction with a driving signal shown in FIG. 6.

As shown in FIG. 5, the driving circuit 100 in the embodiment includes a common electrode driving unit 103, a gate driving unit 101, a data line driving unit 102 and a timing control unit (not shown).

The common electrode driving unit 103 is connected to the common electrode 105, and is configured to generate the common voltage signal VCOM and a first pulse signal 201 which is the first signal. The first pulse signal 201 here is a square signal with a low level of 0V and a high level of 2V. The first pulse signal 201 is a detection signal provided to the common electrode used as the touch sensing electrode for realizing touch detection.

The gate driving unit 101 is connected to multiple gate lines $G_1, G_2 \ldots G_M$ and is configured to generate a second pulse signal 202. The gate driving unit 101 may be directly connected to the gate lines $G_1, G_2 \ldots G_M$, or may be connected to the gate lines $G_1, G_2 \ldots G_M$ in a capacitive coupling manner.

The second pulse signal 202 is the second signal, and the second pulse signal 202 here is a square signal with a low level of −12V and a high level of −10V. The second pulse signal 202 is a pulse signal with a same frequency and a same amplitude (which is 2V) as the first pulse signal 201. The high level of the second pulse signal 202 is much smaller than a threshold voltage of the thin film transistor 104, so that the thin film transistor 104 is switched off, thereby not affecting a signal provided to a liquid crystal box during the touch sensing stage, and realizing a normal display function of the touch display apparatus.

The data line driving unit 102 is connected to multiple data lines $S_1, S_2 \ldots S_N$ and is configured to generate a third pulse signal 203 which is the third signal. The third pulse signal 203 here is a square signal with a low level of 0V and a high level of 2V. The third pulse signal 203 is a pulse signal with a same frequency and a same amplitude (which is 2V) as the first pulse signal 201.

The timing control unit is connected to the common electrode driving unit 103, the gate driving unit 101 and the data line driving unit 102, and configured to, during the touch sensing stage, control the common electrode driving unit 201 to provide the first pulse signal to the common electrode 105 for realizing touch detection, control the gate driving unit 101 to provide the second pulse signal 202 with the same phase as the first pulse signal 201 to the multiple gate lines $G_1, G_2 \ldots G_M$, and control the data line driving unit 102 to provide the third pulse signal 230 with a same phase as the first pulse signal 201 to the multiple data lines $S_1, S_2 \ldots S_N$.

In the driving circuit 100 of the touch display apparatus according to the embodiment, the second pulse signal 202 with a same frequency, a same phase and a same amplitude as the first pulse signal 201 is provided to multiple gate lines $G_1, G_2 \ldots G_M$ by the gate driving unit 101 during the touch sensing stage. Thus, even a capacitor is formed by the common electrode 105 and the gate lines $G_1, G_2 \ldots G_M$, the capacitor is not charged and discharged, since signals with same frequency, a same phase and a same amplitude are provided to two electrode plates formed by the common electrode 105 and the gate lines $G_1, G_2 \ldots G_M$, that is, voltages of same magnitude are provided to the two electrode plates of the capacitor at any time. Hence, charge and discharge capacity of the capacitor formed by the common electrode 105 and the gate lines $G_1, G_2 \ldots G_M$ is zero. Compared with a case that the second pulse signal 202 is not provided to the gate lines $G_1, G_2 \ldots G_M$, the charge and discharge capacity is decreased up to zero. That is, the capacitor formed by the common electrode 105 and the gate lines $G_1, G_2 \ldots G_M$ does not interfere with touch detection in a practical circuit, and thus the accuracy of the touch detection is improved.

In the driving circuit 100 of the touch display apparatus according to the embodiment, the third pulse signal 203 with a same frequency, a same phase and a same amplitude as the first pulse signal 201 is provided to multiple data lines $S_1, S_2 \ldots S_N$ by the data line driving unit 102 during the touch sensing stage. Thus, even a capacitor is formed by the common electrode 105 and the data lines $S_1, S_2 \ldots S_N$, the capacitor is not charged and discharged, since signals with same frequency, a same phase and a same amplitude are provided to two electrode plates formed by the common electrode 105 and the data lines $S_1, S_2 \ldots S_N$, that is, voltages of same magnitude are provided to the two electrode plates of the capacitor at any time. Hence, charge and discharge capacity of the capacitor formed by the common electrode 105 and the data lines $S_1, S_2 \ldots S_N$ is zero. Compared with a case that the third pulse signal 203 is not provided to the data lines $S_1, S_2 \ldots S_N$, the charge and discharge capacity is decreased up to zero. That is, the capacitor formed by the common electrode 105 and the data lines $S_1, S_2 \ldots S_N$ does not interfere with touch detection in a practical circuit, and thus the accuracy of the touch detection is improved.

It should also be noted that, the second pulse signal 202 and the third pulse signal 203 each have a same frequency, a same phase and a same amplitude as the first pulse signal 201, so that the capacitor formed by the common electrode and the gate lines (the data lines) is not charged and discharged, which are not limited thereto in the present disclosure, as long as the second pulse signal 202 and the third pulse signal 203 each have a same frequency and a same phase as the first pulse signal 201. Even magnitudes of voltage provided to two electrode plates of the capacitor are different at any time, a potential difference between the electrode plates of the capacitor is decreased compared with a case that no signal is provided to the gate lines, since signals of two electrode plates have same frequency and a same phase. Thus, the charge and discharge capacity of the capacitor formed by the common electrode 105 and the gate lines $G_1, G_2 \ldots G_M$ (the data lines $S_1, S_2 \ldots S_N$) is reduced.

It should be further noted that, the first signal, the second signal and the third signal in an embodiment each are pulse signals, which is not limited in the present disclosure, as long as the signal is a signal provided to the common electrode 105, the gate lines $G_1, G_2 \ldots G_M$ and the data lines $S_1, S_2 \ldots S_N$ so to decrease the charge and discharge capacity of the capacitor.

It should be further noted that, the first signal, the second signal and the third signal in an embodiment each are square signals, which is not limited in the present disclosure. The first signal, the second signal and the third signal in another embodiment may be sine wave signals or stair-step signals.

The driving circuit 100 of the touch display apparatus in the embodiment can reduce an effect of the parasitic capacitor between the common electrode 105 and the gate lines $G_1, G_2 \ldots G_M$, and can reduce an effect of the parasitic capacitor between the common electrode 105 and the data lines $S_1, S_2 \ldots S_N$, which is not limited in the present disclosure. In a touch display apparatus according to another embodiment, only the gate driving unit 101 may be arranged, for reducing interference of the parasitic capacitor between the common electrode 105 and the gate lines $G_1, G_2 \ldots G_M$ to the touch detection. In the embodiment in which only the gate driving unit 101 is arranged, the timing control unit only controls the gate driving unit 101 to provide the second pulse signal 202 with a same phase as the first pulse signal 201 to the multiple gate lines $G_1, G_2 \ldots G_M$.

Alternatively, in a touch display apparatus according to another embodiment, only the data line driving unit 102 may be arranged, for reducing interference of the parasitic capacitor between the common electrode 105 and the data lines $S_1, S_2 \ldots S_N$ to the touch detection. In the embodiment in which only the data line driving unit 102 is arranged, the timing control unit only controls the data line driving unit 102 to provide the third pulse signal 203 with a same phase as the first pulse signal 201 to the multiple data lines $S_1, S_2 \ldots S_N$.

Reference is made to FIG. 5 and FIG. 6 continuously, the driving circuit 100 of the touch display apparatus according to the embodiment serves to perform both driving display and driving touch detection. A circuit part of driving display and a circuit part of driving touch detection together are integrated into the driving circuit 100.

Specifically, the driving circuit 100 is further configured to provide a driving signal to the gate lines $G_1, G_2 \ldots G_M$, provide a display signal to the data lines $S_1, S_2 \ldots S_N$, and provide a common voltage signal to the common electrode 105, during a display stage, which is not limited in the present disclosure. In another embodiment, the driving circuit may only function to perform the driving touch detection, as long as the driving circuit can reduce the interference of the parasitic capacitor during the touch sensing stage.

Specifically, the driving circuit 100 includes a total timing controller (not shown) and is configured to drive to the display stage and the touch sensing stage in a time-sharing manner. The driving circuit 100 during the touch sensing stage is not described herein, and reference may be made to the above description. In the following, an operation of the driving circuit 100 during the display stage is introduced in detail.

As shown in FIG. 6, the gate driving unit 101 of the driving circuit 100 is further configured to generate the driving signal. Specifically, the driving circuit herein generates timing pulse signals driving the gate lines $G_1, G_2 \ldots G_M$ sequentially, and the pulse signal is a pulse signal with a high level of 15V and a low level of 0V.

The data line driving unit 102 is further configured to generate a display signal D.

The common electrode driving unit 103 is further configured to generate a common voltage signal VCOM.

The timing control unit is connected to the common electrode driving unit 103, the gate driving unit 101 and the data line driving unit 102. The timing control unit is configured to, during the display stage, control the gate driving unit 101 to provide a driving signal to multiple gate lines $G_1, G_2 \ldots G_M$ sequentially, control the data line driving unit 102 to provide the display signal D to the data lines $S_1, S_2 \ldots$ $S_N$, and control the common electrode driving unit 103 to provide the common voltage signal VCOM to the common electrode 105. The timing control unit is further configured to, during the touch sensing stage, control the common electrode driving unit 103 to provide the first pulse signal 201 to the common electrode 105 for realizing touch detection, and control the gate driving unit 101 to provide the second pulse signal 202 with a same phase as the first pulse signal 201 to the multiple gate lines $G_1, G_2 \ldots G_M$. The timing control unit is further configured to control the data line driving unit 102 to provide the third pulse signal 202 with a same phase as the first pulse signal to multiple data lines $S_1, S_2 \ldots S_N$ during the touch sensing stage.

In the following, the driving circuit 100 is further explained in conjunction with a specific circuit.

Figure 7:
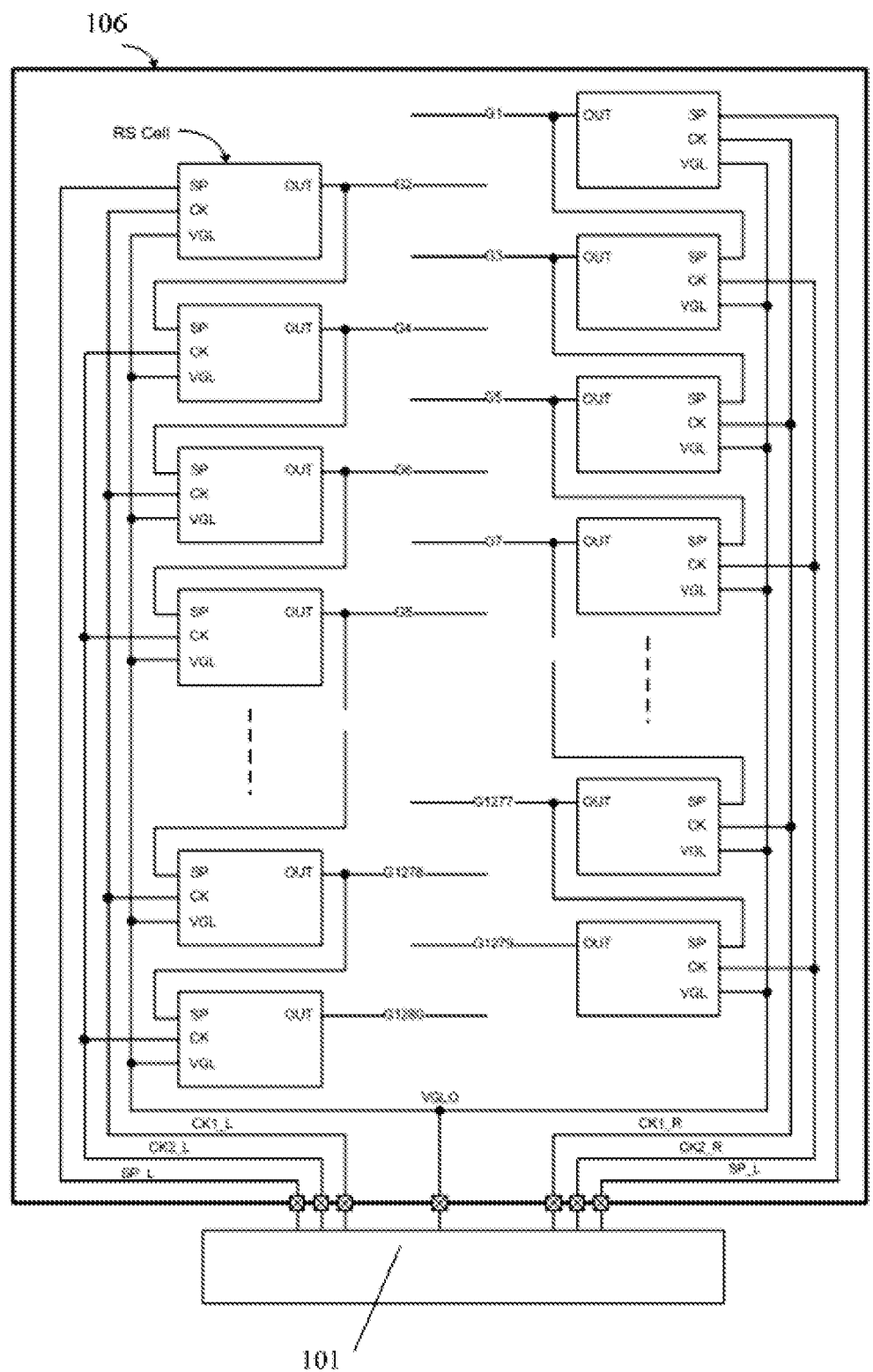
FIG. 7 is a schematic diagram of a driving circuit shown in FIG. 5 according to an embodiment.

Reference is made to FIG. 7, a schematic diagram of a driving circuit shown in FIG. 5 according to an embodiment is shown. The driving circuit 100 in the embodiment further includes an on-screen gate circuit 106 arranged on a screen (a region of a dashed box shown in FIG. 5). It should be noted that, a touch display apparatus with a resolution of 1280×720RGB is taken as an example herein. 640 gate lines are generated at each side of the screen on right and left. Specifically, the on-screen gate circuit 106 is formed by connecting 640 RS Cell sub-circuits (the RS Cell is used as a latch). In the RS Cell sub-circuit, VGL end is connected to a voltage source provided to the gate line for turning off a thin film transistor TFT, CK end is connected to a clock input signal, SP end is a data input end, and OUT is an output end.

Logic control signals provided to the RS Cell sub-circuit by the gate driving unit 101 include: CK1_L, CK2_L, SP_L, CK1_R, CK2_R, SP_R and VGLO for driving the gate lines $G_1, G_2 \ldots G_M$ (M is 1280).

Figure 8:
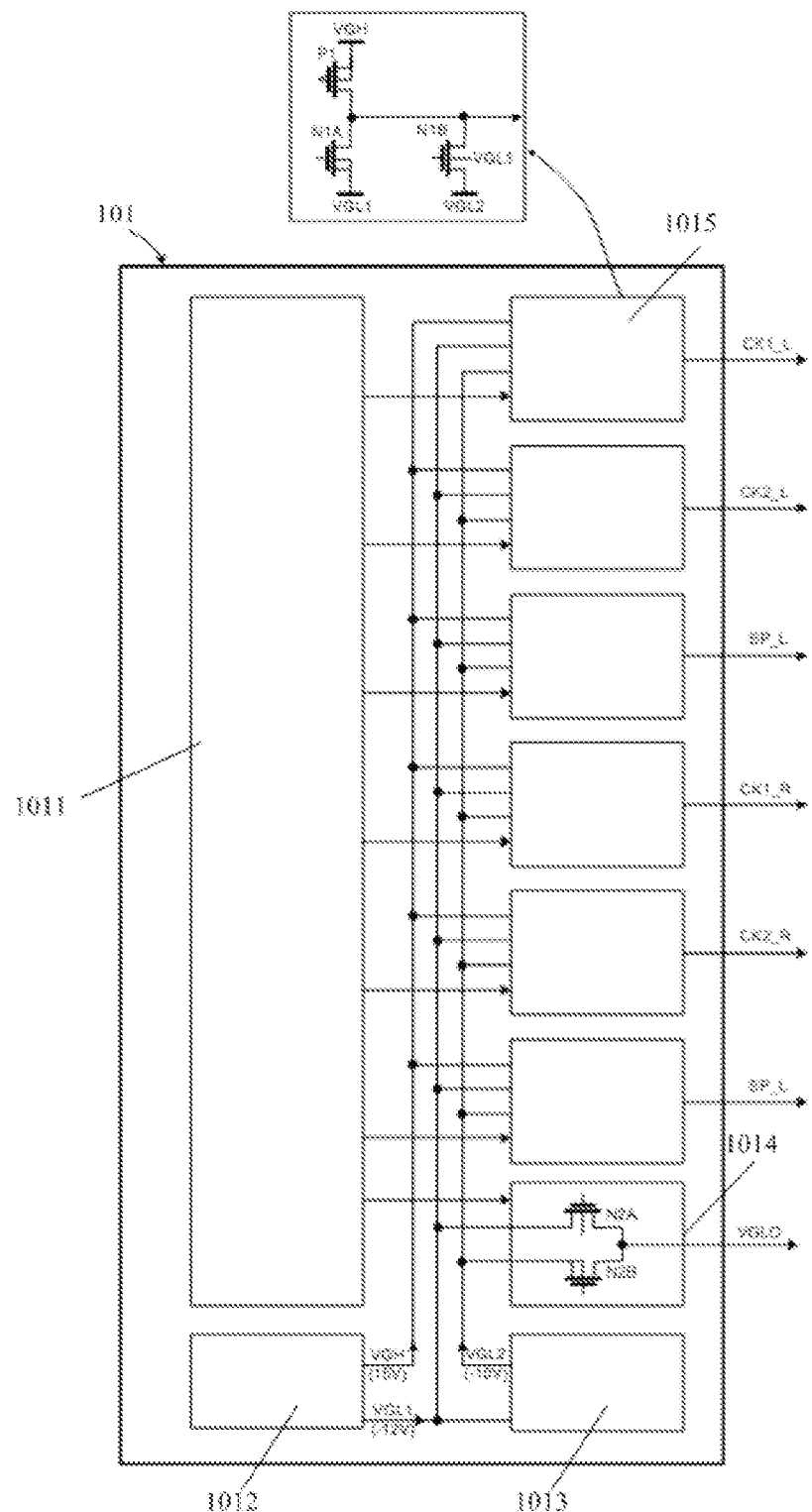
FIG. 8 is a schematic diagram of a gate driving unit shown in FIG. 5 according to an embodiment.

Reference is made to FIG. 8, a schematic diagram of a gate driving unit 101 shown in FIG. 5 according to an embodiment is shown. The gate driving unit 101 includes a charge pump 1012, a voltage regulator 1013, multiple high voltage driving units 1015, a power signal unit 1014 and a timing control unit 1011.

The charge pump 1012 includes a first output terminal configured to output a first voltage VGH (15V) for driving the thin film transistor to turn on; and a second output terminal configured to output a second voltage VGL1 (−12V) for controlling the thin film transistor to turn off.

The voltage regulator 1013 is connected to the second output terminal of the charge pump 1012 and is configured to adjust the second voltage outputted by the charge pump 1012 to form a third voltage VGL2 (−10V). The second voltage and the third voltage correspond to a low level and a high level of the second pulse signal 202 respectively.

An input terminal of the multiple high voltage driving units 1015 is connected to the first output terminal and the second output terminal of the charge pump 1012 and the voltage regulator 1013. An output terminal of the high voltage driving units 1015 is connected to the SP end, which is the data input terminal, of the RS Cell sub-circuit and the CK end for outputting the logic control signals CK1_L, CK2_L, SP_L, CK1_R, CK2_R and SP_R.

Specifically, the high voltage driving unit 1015 includes a first PMOS transistor P1, a first NMOS transistor N1A and a second NMOS transistor N1B. A source of the first PMOS transistor P1 is connected to the first output terminal of the charge pump 1012 (provided with the first voltage VGH), and a gate of the first MOS transistor P1 is connected to a first timing controller (not shown). A source of the first NMOS transistor N1A is connected to the second output terminal of the charge pump 1012 (provided with the second voltage VGL), and a gate of the first NMOS transistor N1A is connected to a third timing controller and a second timing controller. A source of the second NMOS transistor N1B is connected to the voltage regulator 1013 (provided with the third voltage VGL2), a gate of the second NMOS transistor N1B is connected to the second timing controller, and a drain of the second NMOS transistor N1B is connected to a drain of the first NMOS transistor N1A and a drain of the first PMOS transistor P1.

An input terminal of the power signal unit 1014 is connected to the second output terminal of the charge pump 1012 and the voltage regulator, and an output terminal of the power signal unit 1014 is connected to a voltage source VGL input terminal of the multiple RS Cell sub-circuits.

Specifically, the power signal unit 1014 includes a third NMOS transistor N2A and a fourth NMOS transistor N2B. A source of the third NMOS transistor N2A is connected to a third output terminal of the charge pump 1012, and a gate of the third NMOS transistor N2A is connected to the second timing controller. A source of the fourth NMOS transistor N2B is connected to an output terminal of the voltage regulator 1013, a gate of the fourth NMOS transistor N2B is connected to the second timing controller, and a drain of the fourth NMOS transistor N2B is connected to a drain of the third NMOS transistor.

The timing control unit 1011 includes a first timing controller (not shown). The first timing controller is connected to the high voltage driving unit 1015 for driving the high voltage driving unit 1015 to output the first voltage VGH and the second voltage VGL1 alternately to provide the first voltage VGH and the second voltage VGL1 to the multiple gate lines in a time-sharing manner, thereby providing a driving signal to multiple gate lines in a time-sharing manner to be used in the display stage.

The timing control unit 1011 further includes a second timing controller. The second timing controller is connected to the high voltage driving unit 1015 and the power signal unit 1014. The second timing controller is configured to drive the power signal unit 1014 to output the second voltage VGL1 and the third voltage VGL2 to an input terminal of the voltage source VGL of the RS Cell sub-circuit alternately. The second timing controller is further configured to control the high voltage driving unit 1015 to output the second voltage VGL1 and the third voltage VGL2 to the data input terminal SP of the RS Cell sub-circuit alternately, so that a signal from the voltage source VGL input terminal of the RS Cell sub-circuit is outputted to the output terminal OUT of the RS Cell sub-circuit to provide the second pulse signal 202 to multiple gate lines to be used in the touch sensing stage.

The timing control unit 1011 further includes a total timing controller (not shown). The total timing controller is connected to the first timing controller and the second timing controller, and is configured to control the first timing controller to perform the driving during the display stage and control the second timing controller to perform the driving during the touch sensing stage.

Figure 9:
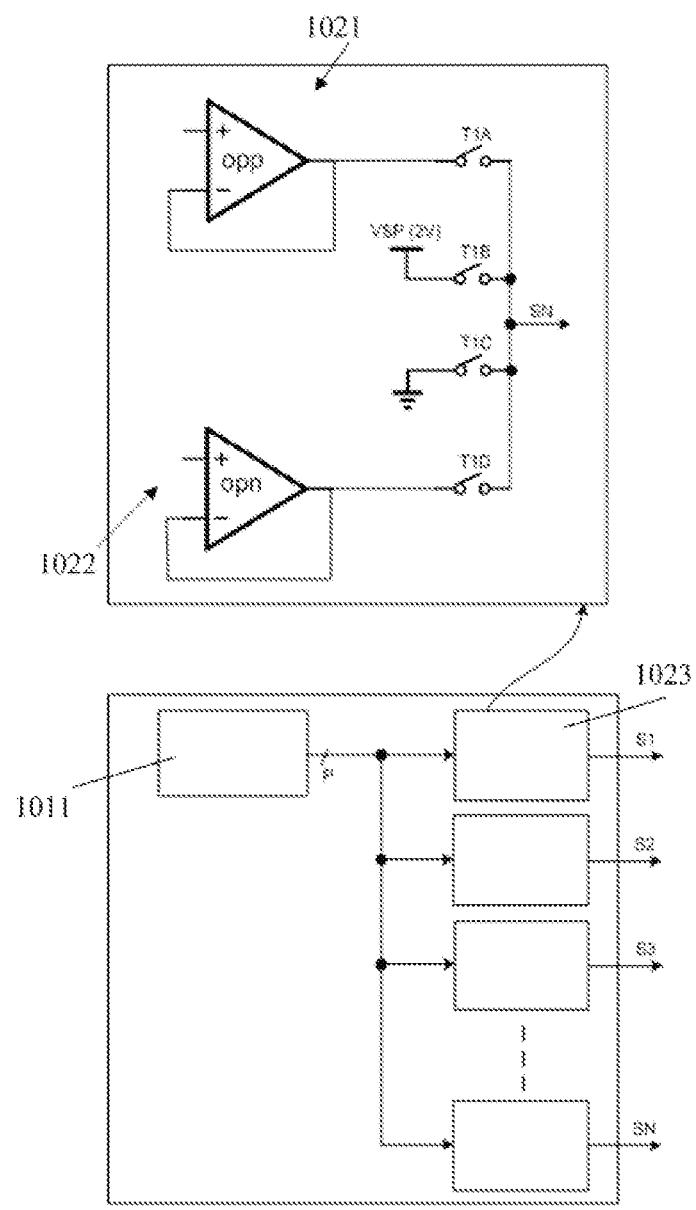
FIG. 9 is a schematic diagram of a common electrode driving unit shown in FIG. 5 according to an embodiment.

Reference is made to FIG. 9, a schematic diagram of a data line driving unit shown in FIG. 5 according to an embodiment is shown. Specifically, the data line driving unit includes a timing control unit 1011 and multiple data line signal buffers 1023.

The multiple data line signal buffers 1023 correspond to multiple data lines $S_1, S_2 \ldots S_N$ respectively.

The data line signal buffer 1023 includes a positive driving circuit 1021 and a negative driving circuit 1022.

An output terminal of the positive driving circuit 1021 is connected to the corresponding one of the data lines for generating a first pixel voltage driving liquid crystal molecules to rotate towards a first direction as the display signal, and a first switch T1A is arranged near the output terminal of the positive driving circuit.

An output terminal of the negative driving circuit 1022 is connected to the corresponding one of the data lines for generating a second pixel voltage driving liquid crystal molecules to rotate towards a second direction as a display signal, and a second switch T1D is arranged near the output terminal of the negative driving circuit.

The data line driving unit further includes a third switch T1B and a fourth switch T1C. One end of the third switch T1B is connected to a voltage source VSP (a voltage of which is 2V), and the other end of the third switch T1B is connected to an output terminal of the data line driving unit. One end of the fourth switch T1C is connected to the ground, and the other end of the fourth switch T1C is connected to the output terminal of the data line driving unit.

The timing control unit 1011 further includes a third timing controller (not shown). The third timing controller is driven by the total timing controller during the display stage, and is connected to the positive driving circuit 1021 and the negative driving circuit 1022. The third timing controller is configured to drive the first switch T1A and the second switch T1D to be switched on alternately, so that the positive driving circuit and the negative driving circuit output the first pixel voltage and the second pixel voltage respectively.

The timing control unit 1011 further includes a fourth timing controller. The fourth timing controller is driven by the total timing controller during the touch sensing stage, and is configured to drive the third switch T1B (not shown) and the fourth switch T1C to be switched on alternately, so as to output the third pulse signal 203 with a high level being a voltage of the voltage source and a low level of 0V in a time-sharing manner.

Figure 1:
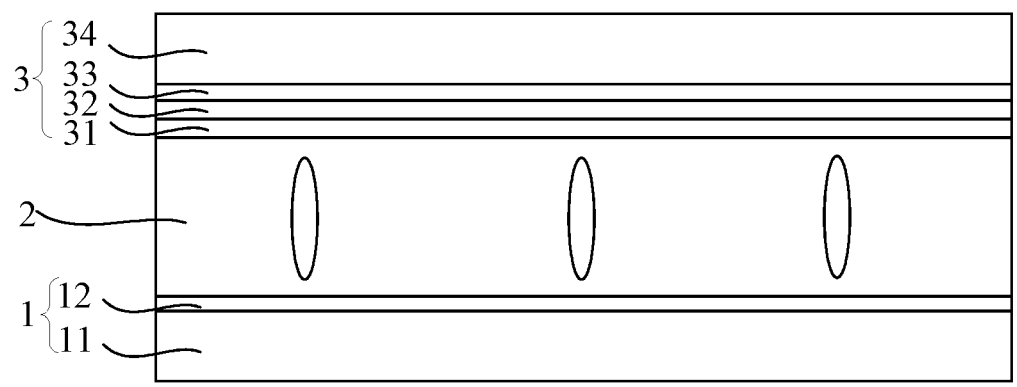
FIG. 1 is a schematic diagram of a liquid crystal display apparatus with an in-cell touch panel according to the conventional technology.
Figure 2:
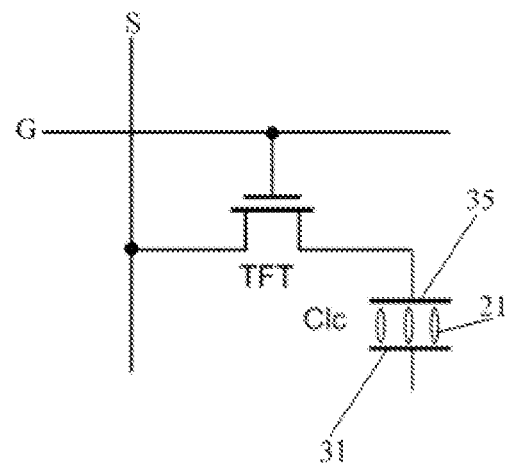
FIG. 2 is an equivalent circuit diagram of a sub-pixel unit as shown in FIG. 1.
Figure 3:
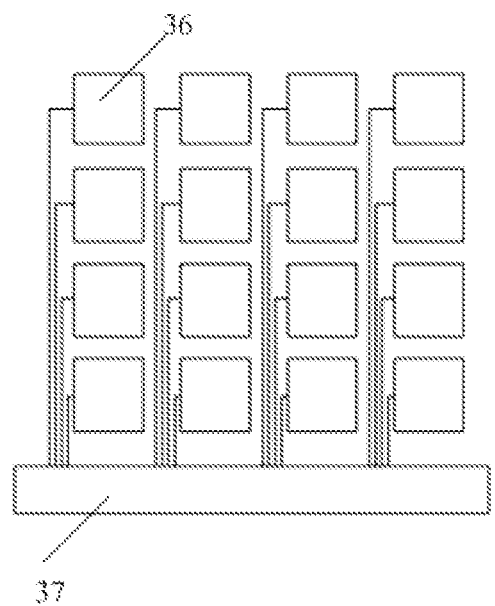
FIG. 3 is a schematic diagram of a common electrode having a function of self-capacitive touch detection according to the conventional technology.
Figure 4:
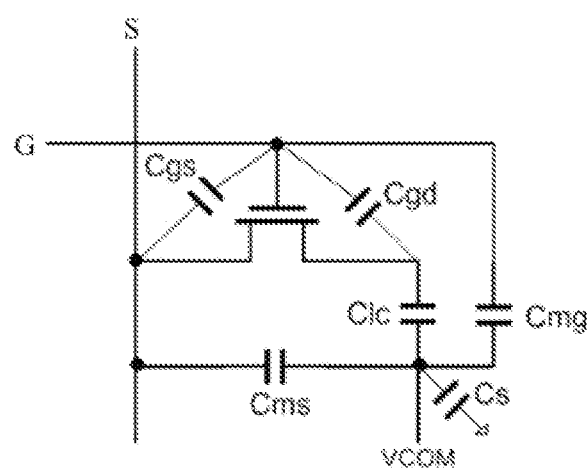
FIG. 4 is an equivalent circuit diagram of a sub-pixel unit of a touch display apparatus in which a conventional common electrode is reused as a touch electrode according to the conventional technology.
Figure 10:
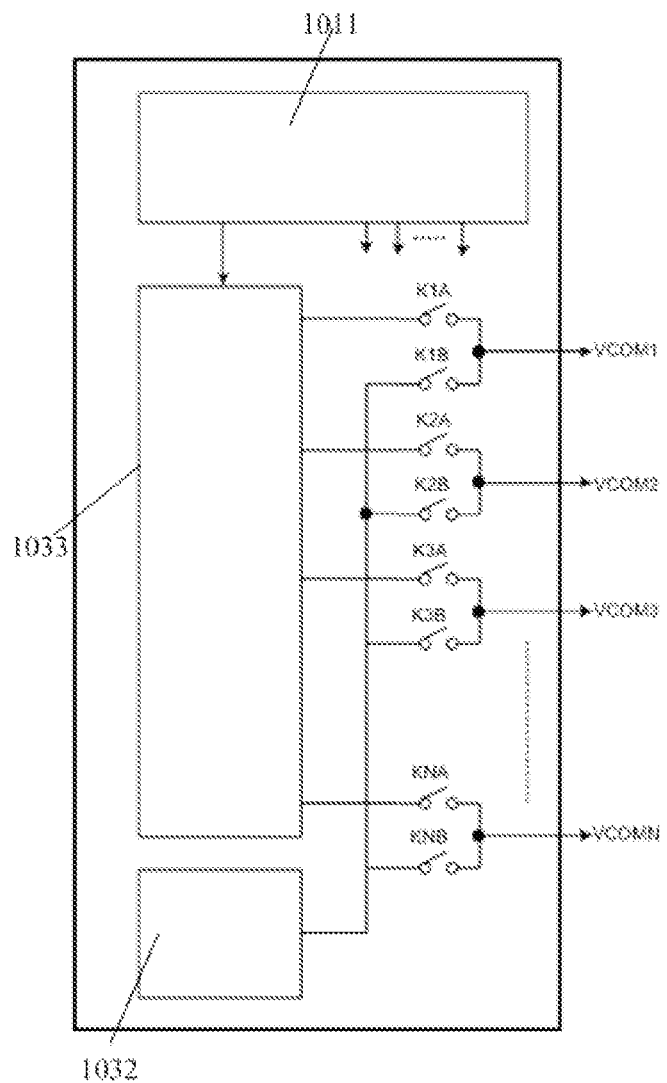
FIG. 10 is a schematic diagram of a data line driving unit shown in FIG. 5 according to an embodiment.

Reference is made to FIG. 10, which is a schematic diagram of a common electrode driving unit shown in FIG. 1 according to an embodiment. The common electrode driving unit includes a touch detection circuit 1033, a common electrode driving buffer 1032 and a timing control unit 1011.

The touch detection circuit 1033 is connected to multiple electrode units of the common electrode 105 via first switches K1A, K2A . . . KNA respectively, and is configured to provide the first pulse signal to the multiple electrode units in a case that the first switches K1A, K2A . . . KNA are switched on for realizing touch detection.

The common electrode driving buffer 1032 is connected to the multiple electrode units of the common electrode 105 via second switches K1B, K2B . . . KNB respectively, and is configured to provide the common voltage signal to the multiple electrode units in a case that the second switches K1B, K2B . . . KNB are switched on.

The timing control unit 1011 is connected to the first switches K1A, K2A . . . KNA and the second switches K1B, K2B . . . KNB. The timing control unit 1011 is configured to drive the first switches K1A, K2A . . . KNA to be switched on during the touch sensing stage so that the touch detection circuit 1033 performs self-capacitance detection on the multiple electrode units of the common electrode 105. The timing control unit 1011 is further configured to drive the second switches K1B, K2B . . . KNB to be switched on during the display stage so as to control the common electrode driving buffer 1032 to provide the common voltage signal to the multiple electrode units of the common electrode 105.

It should be noted that, FIG. 8, FIG. 9 and FIG. 10 show specific implementations of the gate driving unit 101, the data line driving unit 102 and the common electrode driving unit 103 respectively, which is not limited in the present disclosure. In another embodiment, the gate driving unit 101, the data line driving unit 102 and the common electrode driving unit 103 may be implemented in other circuit configuration.

Alternatively, in other embodiment, the gate driving unit (or the data line driving unit) of the driving circuit may realize only the display function. During the touch sensing stage, the data line driving circuit provides a pulse signal corresponding to the first signal to the data line (or the gate line driving circuit provides a pulse signal corresponding to the first signal to the gate line). That is, by only reducing the interference of parasitic capacitor formed by the data line (or the gate line) and the common electrode to the touch detection, the accuracy of the touch detection is improved.

It should be noted that, in the above embodiment, the third signal is a signal provided to the data line by the driving circuit, charge and discharge capacity of a capacitor is decreased by using the third signal provided to the data line and the first signal provided to the common electrode, which is not limited in the present disclosure. In other embodiment, the third signal may not be a signal provided to the data line.

Figure 11:
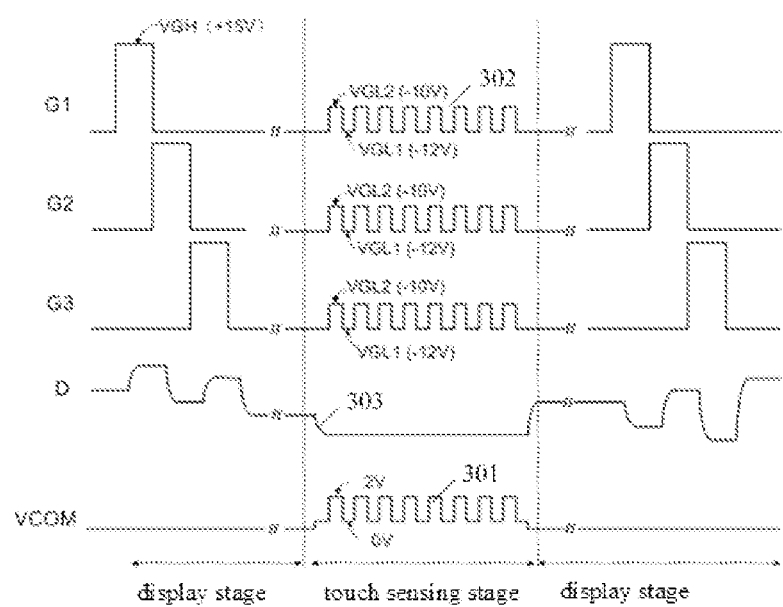
FIG. 11 is a schematic diagram of a touch display apparatus according to another embodiment of the present disclosure.

Reference is made to FIG. 11, a schematic diagram of a touch display apparatus according to another embodiment of the present disclosure is shown. The similarities between this embodiment and the embodiment shown in FIG. 5 are not described. This embodiment is different from the embodiment shown in FIG. 5 in that, the driving circuit is coupled to the data line via the switch (no shown). The third signal 303 in this embodiment is a signal for controlling the switch to be switched off and may control the data line to enter a floating state during the touch sensing stage. In the floating state, the data line connected to the driving circuit during the display stage is disconnected from the driving circuit during the touch sensing stage.

Thus, the data line is disconnected from the driving circuit during the touch sensing stage and is not provided with any signal. Hence, during the touch sensing stage, in a capacitor formed by the common electrode and the data line, an electrode plate corresponding to the data line is not connected to any device, and the capacitor is not charged and discharged, thus the charge and discharge capacity is decreased and the accuracy of the touch detection is improved.

Specifically, the similarities between the driving circuit having both the display function and the touch detecting function and the previous embodiment are not described. The driving circuit differs from that in the previous embodiment in that, the driving circuit further includes: switches arranged between the data line driving unit and the multiple data lines, and the data line driving unit is configured to provide a pixel voltage to the data line as a display signal in a case that the switch is on; and the timing control unit is connected to the switch, the timing control unit is configured to control the switch to be switched on during the display stage to control the data line driving unit to provide the pixel voltage to the data line, and the timing control unit is further configured to control the switch to be switched off during the touch sensing stage via the third signal 303 to control the data line to enter a floating state, to decrease the interference of the parasitic capacitor formed by the data line and the common electrode to the touch detection during the touch sensing stage.

It should be noted that, in the embodiment shown in FIG. 11, the gate driving unit further provides the second pulse signal 302 with a same frequency, a same phase and a same amplitude as the first pulse signal 301 to the multiple gate lines $G_1, G_2 \ldots G_M$ to reduce the interference of the parasitic capacitor formed by the common electrode and the gate line and the interference of the parasitic capacitor formed by the common electrode and the data line. In other embodiment, the gate driving unit of the driving circuit may realize only the display function, the driving circuit during the touch sensing stage controls the data line to enter a floating state. That is, by only reducing the interference of the parasitic capacitor between the data line and the common electrode to the touch detection, the accuracy of the touch detection is improved.

Accordingly, it is further provided a driving circuit according to the present disclosure, which is applied to a touch display apparatus. The touch display apparatus includes: a first substrate; a second substrate arranged opposite to the first substrate, where gate lines, data lines and thin film transistors are arranged on a surface of the second substrate facing towards the first substrate; a liquid crystal layer arranged between the first substrate and the second substrate; and a common electrode arranged between the first substrate and the second substrate and used as a touch sensing electrode during a touch sensing stage.

The driving circuit includes: a first driving module configured to provide a first signal to the common electrode for realizing touch detection during the touch sensing stage; a second driving module configured to provide a second signal to the gate line during the touch sensing stage, where the second signal is used to control the thin film transistor to be switched off and is used to decrease charge and discharge capacity of a capacitor formed by the common electrode and the gate line; and/or a third driving module configured to provide a third signal to the data line during the touch sensing stage, where the third signal is used to decrease charge and discharge capacity of a capacitor formed by the common electrode and the data line.

Specifically, the first driving module includes a common electrode driving unit and a part of the timing control unit for driving the common electrode driving unit; the second driving module includes a gate driving unit and a part of the timing control unit for driving the gate driving unit; and the third driving module includes a data line driving unit and a part of the timing control unit for driving the data line driving unit.

The related description of the driving circuit has been given in the related embodiment of the touch display apparatus, which is not described herein.

It is further provided a driving method for driving a touch display apparatus according to the present disclosure. The touch display apparatus includes: a first substrate; a second substrate arranged opposite to the first substrate, where gate lines, data lines and thin film transistors are arranged on a surface of the second substrate facing towards the first substrate; a liquid crystal layer arranged between the first substrate and the second substrate; and a common electrode arranged between the first substrate and the second substrate and used as a touch sensing electrode during a touch sensing stage.

The driving method includes:

providing a driving signal to the multiple gate lines sequentially, providing a display signal to the data line, and providing a common voltage signal to multiple electrode units of the common electrode, during a display stage; and providing a first signal to the common electrode for realizing touch detection during the touch sensing stage; providing a second signal to the gate line in the process of providing the first signal to the common electrode, where the second signal is used to control the thin film transistor to be switched off and is used to decrease charge and discharge capacity of a capacitor formed by the common electrode and the gate line; and/or providing a third signal in the process of providing the first signal to the common electrode, where the third signal is used to decrease charge and discharge capacity of a capacitor formed by the common electrode and the data line.

With the driving method according to the present disclosure, during the touch sensing stage, the first signal is provided to the common electrode, the second signal is provided to the gate line and/or the third signal is provided, thus charge and discharge capacity of a parasitic capacitor formed by the common electrode and the gate line and/or the data line is decreased. Interference of the parasitic capacitor to the touch detection is reduced by decreasing the charge and discharge capacity of the parasitic capacitor, thus the accuracy of touch detection is improved.

Optionally, the second signal is a pulse signal with a same frequency, a same phase and a same amplitude as the first signal, so that the capacitor formed by the common electrode and the gate line is not charged and discharged, that is, the charge and discharge capacity is decreased to zero, which is not limited in the present disclosure. In other embodiment, the second is a pulse signal with a same frequency and a same phase as the first signal, and the charge and discharge capacity can also be decreased.

Optionally, in the process of providing the third signal, the third signal is provided to the data line. The third signal is a pulse signal with a same frequency, a same phase and a same amplitude as the first signal, so that the capacitor formed by the common electrode and the data line is not charged and discharged, that is, the charge and discharge capacity is decreased to zero to reduce the interference of the parasitic capacitor, which is not limited in the present disclosure. In other embodiment, the third signal is a pulse signal with a same frequency and a same phase as the first signal, and the charge and discharge capacity can also be decreased.

Optionally, the third signal may not be a signal provided to the data line, and may be a signal used to control the data line to enter a floating state. Specifically, the data line may be coupled to the driving circuit via a switch, and the third signal may be a signal for controlling the driving circuit to be disconnected from the data line so as to control the data line to enter a floating state, so that the capacitor formed by the common electrode and the data line is not charged and discharged, that is, the charge and discharge capacity is decreased to zero.

In the driving method according to the present disclosure, a form of the first signal, the second signal or the third signal is not limited, which may be a pulse signal, such as a square signal, a sine wave signal or a stair-step signal, or may not be a pulse signal.

It should be noted that, the driving method according to the present disclosure may be performed by the driving circuit according to the present disclosure, or may be performed by other driving circuit, which is not limited in the present disclosure.

Although the present invention is disclosed above, the present invention should not be limited thereto. Various changes and modifications can be made by those skilled in the art without departing from the spirit and scope of the present invention. Therefore, the scope of protection of the present invention should be defined by the appending claims.

The invention claimed is:

1. A touch display apparatus for realizing touch sensing and displaying, comprising:
a driving circuit configured to provide a first signal to a common electrode of the touch display apparatus for realizing touch detection during a touch sensing stage, wherein the common electrode includes multiple electrode units arranged in a matrix, and the first signal provided to the common electrode is then applied to the multiple electrode units for realizing self-capacitive detection;
wherein the driving circuit is further configured to provide a second signal to multiple gate lines of the touch display apparatus during the touch sensing stage, wherein the second signal is used to control a thin film transistor of the touch display apparatus to be switched off and is used to decrease charge and discharge capacity of a capacitor formed by the common electrode and the multiple gate lines, wherein a high level of the second signal is smaller than a threshold voltage of the thin film transistor, wherein the second signal is a pulse signal with a same frequency and a same phase as the first signal, but has a different amplitude from the first signal; and
wherein the driving circuit is further configured to provide a third signal during the touch sensing stage, the third signal is used to control a data line to enter and maintain a floating state during the touch sensing stage to decrease charge and discharge capacity of a capacitor formed by the common electrode and the data line of the touch display apparatus, wherein the data line is not provided with a ground signal during the touch sensing stage.

2. The touch display apparatus according to claim 1, wherein the driving circuit is coupled to the data line via a switch, and the third signal is used to control the switch to be switched off to control the data line to enter the floating state.

3. The touch display apparatus according to claim 1, wherein the driving circuit comprises:
a common electrode driving unit configured to generate a common voltage signal and the first signal, wherein the common voltage signal is provided to the common electrode during a display stage;
a gate driving unit coupled to the multiple gate lines, wherein the gate driving unit is configured to generate a driving signal, and is further configured to generate the second signal, wherein the second signal has a same frequency as the first signal, and the driving signal is provided to the gate lines during the display stage;
a data line driving unit coupled to a plurality of data lines, and configured to generate a display signal, wherein the display signal is provided to the data lines during the display stage;
and
a timing control unit coupled to the common electrode driving unit, the gate driving unit and the data line driving unit, wherein the timing control unit is configured to, during the display stage, control the gate driving unit to provide the driving signal to the multiple gate lines sequentially, control the data line driving unit to provide the display signal to the data line, and control the common electrode driving unit to provide the common voltage signal to the common electrode; and the timing control unit is further configured to, during the touch sensing stage, control the common electrode driving unit to provide the first signal to the common electrode for realizing touch detection, and control the gate driving unit to provide the second signal to the multiple gate lines, wherein the second signal has a same phase as the first signal.

4. The touch display apparatus according to claim 3, wherein the driving circuit further comprises switches arranged between the data line driving unit and the plurality of data lines, and the data line driving unit is configured to provide a pixel voltage to the data lines as a display signal in a case that the switches are on; and
the timing control unit is connected to the switches, the timing control unit is configured to control the switches to be switched on during the display stage to control the data line driving unit to provide the pixel voltage to the data line, and the timing control unit is further configured to control the switches to be switched off during the touch sensing stage via the third signal to control the data line to enter the floating state.

5. The touch display apparatus according to claim 1, wherein the driving circuit comprises:
a common electrode driving unit configured to generate a common voltage signal and the first signal, wherein the common voltage signal is provided to the common electrode during a display stage;
a gate driving unit coupled to the multiple gate lines, and configured to generate a driving signal, wherein the driving signal is provided to the multiple gate lines during the display stage;
a data line driving unit coupled to a plurality of data lines, wherein the data line driving unit is configured to generate a display signal, the display signal is provided to the data lines during the display stage; and
a timing control unit coupled to the common electrode driving unit, the gate driving unit and the data line driving unit, wherein the timing control unit is configured to, during the display stage, control the gate driving unit to provide the driving signal to the multiple gate lines sequentially, control the data line driving unit to provide the display signal to the data line, and control the common electrode driving unit to provide the common voltage signal to the common electrode; the timing control unit is further configured to control the common electrode driving unit to provide the first signal to the common electrode during the touch sensing stage for realizing touch detection; and the timing control unit is further configured to control the data lines to enter the floating state via the third signal.

6. The touch display apparatus according to claim 5, wherein
the data line driving unit is coupled to the plurality of data lines via switches, and the timing control unit is configured to control the switches to be switched off via the third signal to control the data lines to enter the floating state.

7. The touch display apparatus according to claim 1, wherein
the driving circuit is directly connected to the multiple gate lines; or
the driving circuit is coupled to the multiple gate lines in a capacitive coupling manner.

8. A driving circuit for driving a touch display apparatus, comprising:

a first driving module configured to provide a first signal to a common electrode of the touch display apparatus for realizing touch detection during a touch sensing stage; and a second driving module configured to provide a second signal to a gate line of the touch display apparatus during the touch sensing stage, wherein the second signal is used to control a thin film transistor of the touch display apparatus to be switched off and is used to decrease charge and discharge capacity of a capacitor formed by the common electrode and the gate line, wherein a high level of the second signal is smaller than a threshold voltage of the thin film transistor, wherein the second signal is a pulse signal with a same frequency and a same phase as the first signal, but has a different amplitude from the first signal; and a third driving module configured to provide a third signal during the touch sensing stage, wherein the third signal is used to control a data line to enter and maintain a floating state during the touch sensing stage to decrease charge and discharge capacity of a capacitor formed by the common electrode and the data line of the touch display apparatus, wherein the data line is not provided with a ground signal during the touch sensing stage.

9. The driving circuit according to claim 8, wherein the third driving module is coupled to the data line via a switch, and the third signal is used to control the switch to be switched off to control the data line to enter the floating state.

10. The driving circuit according to claim 8, wherein the driving circuit comprises:

a common electrode driving unit configured to generate a common voltage signal and the first signal, wherein the common voltage signal is provided to the common electrode during a display stage;

a gate driving unit coupled to a plurality of gate lines, wherein the gate driving unit is configured to generate a driving signal, and is further configured to generate the second signal, wherein the second signal has a same frequency as the first signal, and the driving signal is provided to the gate lines during the display stage;

a data line driving unit coupled to a plurality of data lines, and configured to generate a display signal, wherein the display signal is provided to the data lines during the display stage;

a timing control unit coupled to the common electrode driving unit, the gate driving unit and the data line driving unit, wherein the timing control unit is configured to, during the display stage, control the gate driving unit to provide the driving signal to the plurality of gate lines sequentially, control the data line driving unit to provide the display signal to the data line, control the common electrode driving unit to provide the common voltage signal to the common electrode, and the timing control unit is further configured to, during the touch sensing stage, control the common electrode driving unit to provide the first signal to the common electrode for realizing touch detection, and control the gate driving unit to provide the second signal to the plurality of gate lines, wherein the second signal has same phase as the first signal.

11. The driving circuit according to claim 10, wherein the driving circuit further comprises switches arranged between the data line driving unit and the plurality of data lines, and the data line driving unit is configured to provide a pixel voltage to the data lines as a display signal in a case that the switches are on; and the timing control unit is connected to the switches, the timing control unit is configured to control the switches to be switched on during the display stage to control the data line driving unit to provide the pixel voltage to the data line; and the timing control unit is further configured to control the switches to be switched off during the touch sensing stage via the third signal to control the data line to enter floating state.

12. The driving circuit according to claim 8, comprising:

a common electrode driving unit configured to generate a common voltage signal and the first signal, wherein the common voltage signal is provided to the common electrode during a display stage;

a gate driving unit coupled to a plurality of gate lines, and configured to generate a driving signal, wherein the driving signal is provided to the gate lines during the display stage;

a data line driving unit coupled to a plurality of data lines, wherein the data line driving unit is configured to generate a display signal, the display signal is provided to the data lines during the display stage; and a timing control unit coupled to the common electrode driving unit, the gate driving unit and the data line driving unit, wherein the timing control unit is configured to, during the display stage, control the gate driving unit to provide the driving signal to the plurality of gate lines sequentially, control the data line driving unit to provide the display signal to the data line, and control the common electrode driving unit to provide the common voltage signal to the common electrode; the timing control unit is further configured to control the common electrode driving unit to provide the first signal to the common electrode during the touch sensing stage for realizing touch detection, and the timing control unit is further configured to control the data line to enter the floating state via the third signal.

13. The driving circuit according to claim 12, wherein the data line driving unit is coupled to the plurality of data lines via switches, and the timing control unit is configured to control the switches to be switched off via the third signal to control the data lines to enter the floating state.

14. The driving circuit according to claim 8, wherein the first driving module is directly connected to the gate line; or the first driving module is coupled to the gate line in a capacitive coupling manner.

15. A driving method for driving a touch display apparatus, comprising:

providing a driving signal to a plurality of gate lines of the touch display apparatus sequentially, providing a display signal to a data line of the touch display apparatus, and providing a common voltage signal to a plurality of electrode units of a common electrode of the touch display apparatus, during a display stage;

providing a first signal to the common electrode for realizing touch detection during a touch sensing stage, wherein the plurality of electrode units are arranged in a matrix, and the first signal provided to the common electrode is then applied to the plurality of electrode units for realizing self-capacitive detection; and providing a second signal to the gate lines in the process of providing the first signal to the common electrode, wherein the second signal is used to control a thin film transistor of the touch display apparatus to be switched off and is used to decrease charge and discharge capacity of a capacitor formed by the common electrode and the gate lines, wherein a high level of the second signal is smaller than a threshold voltage of the thin film transistor, wherein the second signal is a pulse signal with a same frequency and a same phase as the first signal, but has a different amplitude from the first signal; and providing a third signal in the process of providing the first signal to the common electrode, and controlling the data line to enter and maintain a floating state via the third signal to decrease charge and discharge capacity of a capacitor formed by the common electrode and the data line, wherein the data line is not provided with a ground signal during the touch sensing stage.

16. The driving method according to claim 15, wherein a switch is connected to the data line and the controlling the data line to enter a floating state via the third signal comprises:

controlling the switch to be switched off via the third signal to control the data line to enter the floating state.

* * * * *